United States Patent Office 2,977,214
Patented Mar. 28, 1961

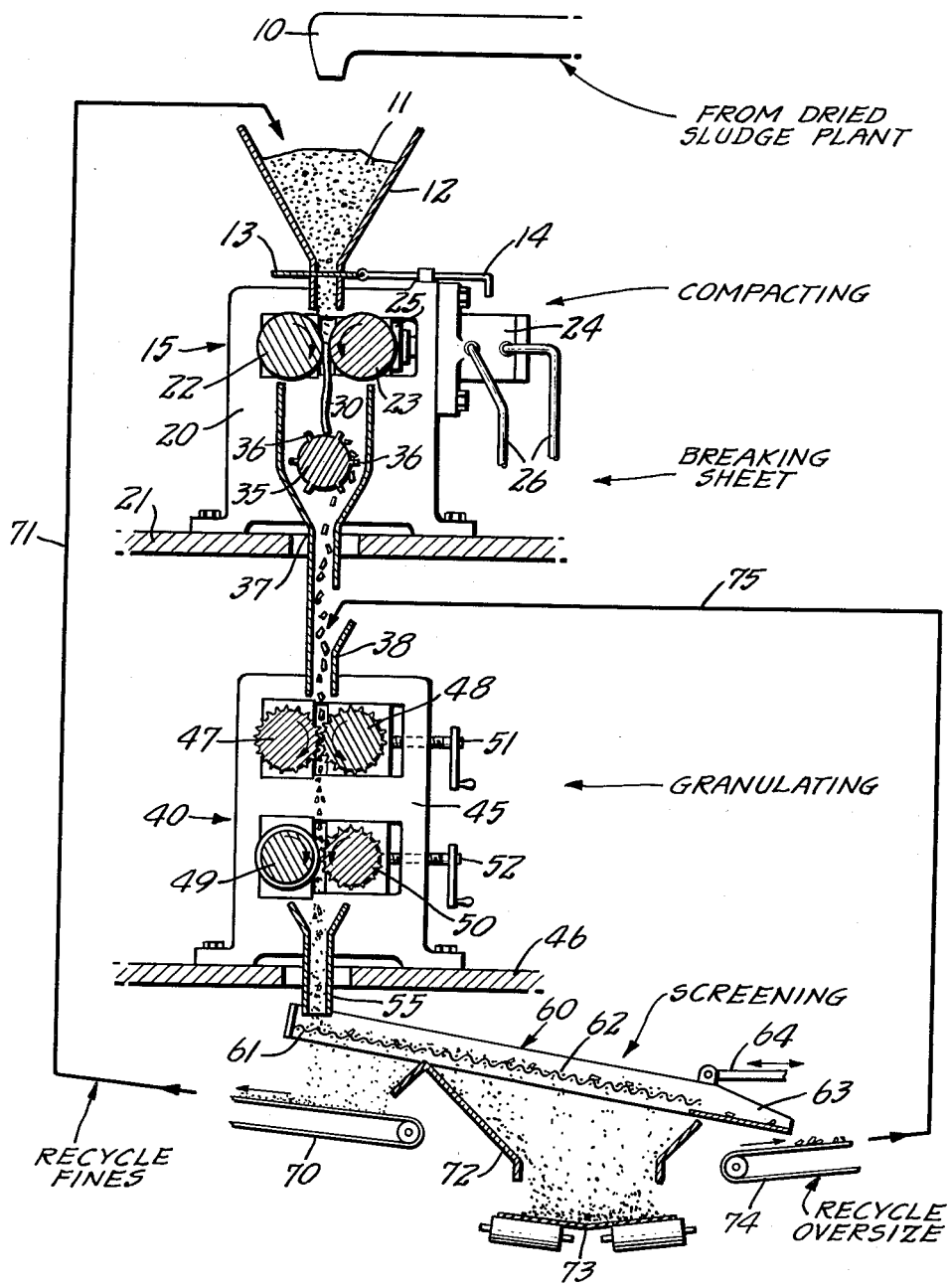

2,977,214
COMPACTED SEWAGE SLUDGE

Jack H. McLellan, Garden City, N.Y., assignor to H. J. Baker & Bro., New York, N.Y.

Filed July 31, 1958, Ser. No. 752,332

2 Claims. (Cl. 71—64)

This invention relates to the compacting of dried sewage sludge from municipal sewage treatment and disposal plants and, more particularly, to the compacting and granulating of highly pulverous dried sewage sludge or residues for increasing the by-product disposal value thereof and decreasing the difficulties and dangers in the handling and storage and shipment of the dried pulverous material.

Conventionally, municipal sewage may be composed of no more than about 0.05% solids in 99.95% water (about one pound of solids in 240 gallons of water). One problem of sewage treatment relates to the separation of these solids from the main stream of water. Since the solids are slimy and gelatinous in a large part, are putrefactive and infectious, and comprise in a large part decomposable organic fibrous, and cellular materials, the separation of the small percentage of solids from the main stream of water may be quite a difficult one.

Some portion of the raw solids can usually be separated merely by gravity settling, but this settled sludge still contains, perhaps, 95% or more water, so the disposal of even a settled portion of the sewage, presents a problem. The very fine (even colloidal) particles which cannot be collected by sedimentation may be treated by the well-known activated sludge process in which the sewage is continuously agitated vigorously with air to promote and accelerate the oxidation of much of the organic matter or the so-called "trickling filter" process for the decomposition thereof by aerobic organisms so that the resultant sludge can be collected on, for example, vacuum filters or otherwise. Still, such filter cake may contain as much as 90% to 95% moisture. A further step may be utilized in which settled sludge or activated sludge or filtered sludge is decomposed further by storing the material in closed tanks, more or less in the absence of air, to accelerate or facilitate further decomposition of the putrefiable components by anaerobic organisms to convert the final sludge into a relatively inert and inoffensive humus-like residue called digested sludge.

Even in this state of advanced decomposition, there results, particularly with medium size or large cities, a sludge which is voluminous (ranging, perhaps, of the order of 75 tons of dry solids per day for a city the size of Baltimore to over 400 tons of dry solids per day for a city the size of Chicago), obnoxious and infectious and odiferous, and still containing more than 75% water, too much for direct disposal by incineration and too great bulk (or odiferous or obnoxious characteristics) for convenient disposal by dumping, lagooning, etc.

Conventionally, the foregoing difficulties are attempted to be avoided by the various municipal disposal plants subjecting the treated or activated or digested sludge to a drying operation, either in rotary driers or flash driers, as is well-known. The results of such drying operation may produce, in finely powdered form (especially with flash driers and/or with a desirably highly digested sludge), organic and fibrous or cellular material of decomposed sewage at moisture contents of no more than 5% to 15%, more or less. Such dried product, then, is in a condition to be finally disposed of by incineration (with, naturally, substantial cost for the drying and inceneration operation) or, in some cases, is in a condition to be disposed of (either by selling at very low prices or, even, being given away) for the fertilizer and soil conditioning agricultural values inherent in both the organic and inorganic constituents and the fibrous or cellular form of the dried sludge.

Even in such instances, however, the sludge is constantly subjected to continued oxidation or bacteriological decomposition to an extent where spontaneous combustion may be a grave danger in the bulk storage thereof, and the pulverous characteristics of the dried sewage sludge presents certain difficulties in the adequate utilization of the by-product fertilizer or soil conditioning properties of the dried sludge, and particularly, as will be understood, in those metropolitan areas where the immediately adjacent agricultural demand for fertilizer or soil conditioning materials does not approach the daily output of the municipal sewage disposal plant. As a purely illustrative example, the agricultural or fertilizer plant food value of the pulverous dried sewage sludge of one city investigated might legitimately be rated at twelve dollars per ton either for use directly by a farmer of for incorporation by a fertilizer manufacturer as additional nutrient in various types of fertilizer. Yet this particular dried sludge, having a density (when poured loosely into bags) of no more than 27 pounds per cubic foot, was so subject to dusting, wind loss in use, spontaneous combustion in bulk storage, and high transportaion costs, that, as an economic question, its valuable by-product function was virtually lost to either the municipality or a potential fertilizer manufacturer or agricultural user.

According to this invention, however, a system is provided for the compacting and granulating of such highly pulverous dried sewage sludge whereby the powdered material can be compacted into useable granules of increased density for economic handling and shipment, with decreased loss due to the pulverous nature of the starting material, and in a manner which both enhances the utility of the dried sludge as by-product fertilizer or soil conditioner material and reduces the dangers incident to spontaneous combustion and continued putrefaction during bulk storage or handling thereof. Furthermore, as a result of treatment according to this invention, the economically realizable value, both to the municipality and to a fertilizer manufacturer or farmer using materials treated in accordance with this invention, is enhanced.

One object of this invention is to provide a method of the character described for the compacting and granulation of dried sewage sludge to increase the density thereof and decrease both the risk of spontaneous combustion during bulk storage and dusting losses during handling for providing relatively small compacted granules of dried sewage sludge for use as a fertilizer and soil conditioner.

Another object of this invention is to provide a system of the character described for the compacting and granulation treatment of highly pulverous sewage sludge to form compacted granules of increased density for enhanced ease of handling, storage, shipping, and utilization either in the manufacture of fertilizers or for direct application of soil in conventional agricultural machines as a fertilizer or soil conditioner.

A further object of this invention is to provide, in a system of the character described, treatment of low moisture content dried organic fibrous and highly pulverous sewage sludge whereby the pulverous material is compacted in the absence of an added binder material and then granulated to form highly compacted granules of increased density for the ready handling, shipment, and storage for valuable byproduct utilization of the sludge substantially in the absence of dusting losses, dangers of spontaneous combustion in bulk storage, etc.

Other objects and advantages of this invention will be apparent from the following description, the accompanying drawing, and the appended claims.

In the drawing is depicted a more or less diagrammatic or schematic flow-sheet representation of the various steps and the combination of apparatus embodying and for practising this invention.

Referring to the drawing, a source of pulverous dried sewage sludge is indicated at 10, purely diagrammatically as indicating a source of pulverous dried sludge material of, perhaps 5-15% moisture content, more or less, conventionally produced by heat drying, as in rotary or flash dryers, as is well-known. The source 10 of dried pulverous sewage sludge is shown as discharging a mass 11 of such dried sludge into a hopper 12 of the illustrated apparatus, with the outlet to hopper 12 controlled by a gate valve 13 with associated operating mechanism 14 for introduction of the mass of pulverous material 11 to the compacting rolls to be described, preferably sufficiently to flood the roll nip.

Compacting apparatus 15 is illustrated as including a main frame member 20 mounted on a base or floor 21 and supporting compacting rolls 22, 23 in suitable bearings and journals not shown. Compacting rolls 21, 23 are driven for rotation as indicated by the arrows thereon by conventional motor means, not shown, and are urged toward each other to provide a high nip pressure therebetween as by a hydraulic mechanism indicated at 24 as including a hydraulic cylinder-and-piston arrangement including bearing piston 25 actuated by hydraulic lines 26, all in known manner. Upon passage of the highly pulverous dried organic and fibrous or cellular sewage sludge material 11 through the high pressure nip of the compacting rolls 22, 23, the pulverous material is compacted into a more or less continuous sheet 30 to assume a rigid and highly frangible character. As sheet 30 emerges in compacted form from the nip between compacting rolls 22, 23, it is subjected to a breaking or fracturing action, as by rotating breaker 35 having breaking fingers 36 therearound which break or fractionate compacted sheet 30 into rather gross flakes or chunks or fragments which flow by gravity out of the outlet 37 from the compacting and breaking apparatus and into the inlet 38 of granulating apparatus 40.

Granulating apparatus 40 is illustrated as having a main frame 45 supported on a base or floor 46 and comprising two sets of corrugated granulating rolls 47—48 and 49—50. Nip or contact or meshing adjustment means are indicated, generally, by the handle and screw arrangements 51, 52, respectively, and, as will be understood, as the broken flakes or chunks of sheet 30 pass into inlet 38 of granulating mechanism 40 and through the nips between rows 47, 48 and 49, 50, the flakes are granulated or further fractionated or broken up into small particles or chunks of the desired size. As illustrated in the drawing, the corrugations of rows 47, 48 are substantially axial, although it may be preferred that the corrugations be at a slight angle to the roll axis, whereas the corrugations on rolls 49, 50 conform to the so-called "Lepage" arrangement for roller mills in which substantially axial corrugations are arranged on roll 50 while roll 49 has substantially circumferential corrugations. In any case, as will be understood, the several rolls are driven by motor means (not shown) and, indeed, preferably at differential speeds as between the two rolls of each pair, and the large fractions or chips broken by breaker 35 from sheet 30 are further granulated by the interaction of the corrugations on rolls 47—48 and 49—50 to produce granulations or particles of the desired compacted form.

The granulated particles leave the final pair of rolls 49—50 and emerge from granulating mechanism 40 through the outlet 55 thereof to drop on to screening mechanism 60, which is illustrated as having a fine screen portion 61, and accepting coarser screen portion 62, and an oversize reject discharge 63. Also indicated at 64 is means for oscillating or shaking screening mechanism 60.

As will be understood, the material emerging from outlet 55 of granulating unit 40 will include unacceptable pulverous fines, granules of an acceptable size, and oversize granules. Initially the fines will drop through the fine screen area 61 on to a conveying mechanism indicated at 70 to be re-cycled, as indicated by the arrows 71 back up to hopper 12 for admixture with the material 11 to be compacted. The granules of acceptable size will fall through or pass the acceptance area 62 of screening mechanism 60, and fall through chute 72 to be received on conveying mechanism indicated at 73 for conveyong to the ultimate storage or bagging or shipment facilities, while oversize granules will pass the acceptance area 62 of screen 60 and emerge at the oversize discharge 63 thereof on to conveying mechanism indicated at 74 to be re-cycled, as indicated by arrow 75 to the inlet 38 of granulating mechanism 40.

As will be seen from the foregoing, highly pulverous material is interjected from a source 10 into hopper 12 and passes continuously through the apparatus until compacted, fractionated, and granulated to a specified or desired granule size for discharge of final conveyor 73 for use as desired.

As purely illustrative of a system embodying and for practising this invention, it may be noted that satisfactory results were achieved using, in compacting unit 15, compacting rolls 22, 23 of the form of smooth rolls 18 inches in diameter by 6-inch face operating at 2 r.p.m. With a dried pulverous free flowing sludge having approximately 5% moisture, and with the nip pressure unit 24 set for a face-to-face initial pressure of about 1,700 pounds per linear inch, a satisfactorily hard sheet 30 was produced with a thickness of 0.055 inch at a rate of 1.8 pounds of material per minute, although, during operation, the nip pressure actually went up to about 3,170 pounds per linear inch. With pulverous material having a moisture content of approximately 10.6%, however, the sheet 30 produced under the foregoing conditions was somewhat softer and more crumbly than optimumly desired. By increasing the initial setting of nip pressure between rolls 22 and 23 to approximately 2,500 pounds, a satisfactory compacted and frangible sheet 30 was produced from the higher moisture content material at a thickness of approximately 0.045 inch and at the rate of 1.8 pounds per minute, during which operation the recorded nip pressure rose to about 4,800 pounds per linear inch.

After formation of the compacted sheet 30, it was broken as by breaker 35, and the large flakes or chunks fed through the granulating rolls in granulating unit 40. Satisfactory results were obtained with granulating unit 40 when the first set of granulating rolls, 47—48, consisted of one roll with four corrugations per inch and one roll with five corrugations per inch, both axial corrugations, and operating at somewhat differential speeds. The second set of rolls were of the "Lepage" type as illustrated at rolls 49, 50, roll 50 having axial corrugations at about ten to the inch, and roll 49 having circumferential corrugations at about eight to the inch. As will be understood, of course, other granulation roll patterns for the corrugations etc., may satisfactorily be used, especially for other mesh size ranges. The granulated product emerging from outlet 55 of corrugating unit 40 was screened on an 8 mesh and 30 mesh screen in a mechanism such as 60, with the production of about 80% of the original feed within the size range of —8 +30 mesh. About 5% was retained on the 8 mesh screen and about 15% went through the 30 mesh screen, with both these rejects being subject to recirculation through the appropriate steps, as noted, if desired.

Whereas the original density of the pulverous material 11 ran from approximately 25 pounds to 28 pounds per cubic foot as poured loosely into a container, the 8-30 mesh granules produced as the acceptable fraction ran approximately 35 pounds per cubic foot, and even the 30 mesh fines were increased in density to from 30 to 35 pounds per cubic foot. Microscopic examination of the interior of sheet 30 (or granules produced therefrom) reveals the inherent fibrous and cellular character of the initial dried sewage sludge starting material and that the compacted substance appears to have a texture similar to, for example, plug tobacco, with the microscopically visible cellular or fibrous particles being closely compressed and flattened parallel to the sheet surface and with both sheet surfaces coated with a thin, glossy black glaze, presumably, resulting from momentary liquifaction of tar-like organic components of the dried raw material under the influence of heat and pressure at the nip of the compacting rolls. It is believed, however, that the strength and frangibility of the formed sheet is a characteristic important for the ultimate granulation (as opposed to merely crumbling or pulverizing) and results mainly from the matting or felting or intertwining of the fibrous and lamellar fragments in the main body portion of the compressed sheets. As will be understood, the particular separate units or elements of the combination of apparatus previously described are each well-known and, indeed, commercially available as compacting mills, breaker apparatus, granulating roller mills, screening apparatus, conveying apparatus, etc., and, accordingly, these individual units or elements need not further be described in detail here for the complete understanding and disclosure of a system embodying and for practising this invention by men skilled in this art.

Although granulating roller mill means 40 is indicated above as giving satisfactory results for granulating the compacted sheet flakes from breaker 35, other types of comminuting and size reduction apparatus also achieve satisfactory results (as, for example, hammermills, cage mills, chain mills, airswept mills, and the like) provided the sludge is first compacted into the desired brittle and frangible sheet for later size reduction to the final granulated particle size.

While the methods described herein constitute preferred embodiments of the invention, it is to be understood that the invention is not limited to these precise methods and that changes may be made therein without departing from the scope of the invention as defined in the accompanying claims.

What is claimed is:

1. A method for compacting and granulating dried and digested pulverous sewage sludge from a sewage disposal works, which sludge includes organic and fibrous digested materials in finely divided powdered condition having a bulk density of about 25–28 lbs./cu. ft. and a moisture content of about 5–15% by weight, the steps which comprise feeding said pulverous and powdered sludge between high pressure compacting rolls for compressing said dried and pulverous sludge into a self-sustaining thin frangible sheet, breaking said thin frangible sheet into gross flake pieces by subjecting said sheet to the breaking action of a plurality of breaking bars mounted around a rotating breaking cylinder, crumbling and granulating said gross flake pieces into more finely comminuted but compacted particles by passing said gross flake pieces between corrugated granulating rolls for compacting and densifying said pulverous sludge into a denser granular form, screening and classifying said granulated compacted particles from said granulating rolls as to the particle size thereof into an acceptable fraction including about 80% of the original pulverous sludge in which the bulk density has been increased by said compacting and granulating steps to about 35 lbs./cu. ft. and a fines fraction of smaller particle size than said acceptable fraction and including about 15% of said original pulverous sludge and an oversize fraction of a greater particle size than acceptable fraction and including about 5% of said original pulverous sludge, recycling said fines fraction back through said feeding and compacting step, and recycling said oversize fraction back through said granulating step for converting substantially all of said pulverous sludge into said compacted and granular form with said increased bulk density.

2. A method for compacting and granulating dried and digested pulverous sewage sludge from a sewage disposal works, which sludge includes organic and fibrous digested materials in finely divided powdered condition having a bulk density of about 25–28 lbs./cu. ft. and a moisture content of about 5–15% by weight, the steps which comprise feeding said pulverous and powdered sludge between high pressure compacting rolls for compressing said dried and pulverous sludge into a self-sustaining thin frangible sheet, breaking said thin frangible sheet into gross flake pieces by subjecting said sheet to the breaking action of a plurality of breaking bars mounted around a rotating breaking cylinder, crumbling and granulating said gross flake pieces into more finely comminuted but compacted particles by passing said gross flake pieces between corrugated granulating rolls for compacting and densifying said pulverous sludge into a denser granular form, screening and classifying said granulated compacted particles from said granulating rolls as to the particle size thereof into an acceptable fraction having a particle size range of about −8 +30 mesh including about 80% of the original pulverous sludge and a fines fraction of a particle size small enough to pass a 30 mesh screen and including about 15% of said original pulverous sludge and an oversize fraction of a particle size to be retained on an 8 mesh screen and including about 5% of said original pulverous sludge, recycling said fines fraction back through said feeding and compacting step, and recycling said oversize fraction back through said granulating step for converting substantially all of said pulverous sludge into said compacted and granular form with said increased bulk density.

References Cited in the file of this patent

UNITED STATES PATENTS

| | | |
|---|---|---|
| 2,087,781 | Randolph | July 20, 1937 |
| 2,461,089 | Smidth | Feb. 8, 1949 |